(12) United States Patent
Ortner et al.

(10) Patent No.: US 9,908,730 B2
(45) Date of Patent: Mar. 6, 2018

(54) METHOD FOR FURTHER PROCESSING THIN GLASS AND THIN GLASS PRODUCED BY SUCH METHOD

(71) Applicant: SCHOTT AG, Mainz (DE)

(72) Inventors: Andreas Ortner, Gau-Algesheim (DE); Clemens Ottermann, Hattersheim (DE); Kurt Nattermann, Ockenheim (DE); Markus Heiss-Chouquet, Bischofsheim (DE); Rainer Liebald, Nauheim (DE)

(73) Assignee: SCHOTT AG, Mainz (DE)

( * ) Notice: Subject to any disclaimer, the term of this patent is extended or adjusted under 35 U.S.C. 154(b) by 123 days.

(21) Appl. No.: 15/084,504

(22) Filed: Mar. 30, 2016

(65) Prior Publication Data

US 2016/0207726 A1    Jul. 21, 2016

Related U.S. Application Data

(63) Continuation of application No. PCT/EP2014/070826, filed on Sep. 29, 2014.

(51) Int. Cl.
*B65H 18/28* (2006.01)
*B65H 20/00* (2006.01)
(Continued)

(52) U.S. Cl.
CPC .............. *B65H 18/28* (2013.01); *B32B 7/06* (2013.01); *B32B 17/064* (2013.01);
(Continued)

(58) Field of Classification Search
CPC ...... B65H 18/08; B65H 18/28; B32B 17/064; B32B 17/065; B32B 7/06; C03C 3/076;
(Continued)

(56) References Cited

U.S. PATENT DOCUMENTS 3,089,801 A    5/1963 Tierney et al.
8,241,751 B2    8/2012 Tomamoto et al.
(Continued)

FOREIGN PATENT DOCUMENTS

CN    102471128    5/2012
EP    2332856    6/2011
JP    2010132349    6/2010

OTHER PUBLICATIONS

English translation of International Preliminary Report on Patentability dated Apr. 5, 2016 for corresponding International Application No. PCT/EP2014/070826, 9 pages.
(Continued)

*Primary Examiner* — Sang K Kim
(74) *Attorney, Agent, or Firm* — Ohlandt, Greeley, Ruggiero & Perle, L.L.P.

(57) ABSTRACT

A method for processing a thin glass is provided. The thin glass is subjected to a tensile stress $\sigma_{app}$ smaller than $$1.15 \cdot \mathrm{Min}\left(\overline{\sigma}_a - \Delta_a 0.4 \cdot \left(1 - \ln\left(\frac{A_{ref}}{A_{App}}\Phi\right)\right),\right.$$
$$\left.\overline{\sigma}_e - \Delta_e 0.4 \cdot \left(1 - \ln\left(\frac{L_{ref}}{L_{App}}\Phi\right)\right)\right),$$

wherein $\overline{\sigma}_a$ is a mean value of tensile stress at break for fractures in a surface of samples of the thin glass under bending stress, wherein $\overline{\sigma}_a$ is a mean value of tensile stress at break for fractures emanating from an edge of the samples, wherein $L_{ref}$ is an edge length and $A_{ref}$ is a surface area of the samples, wherein $\Delta_e$ and $\Delta_a$ denote standard deviations of the mean values $\overline{\sigma}_e$ and $\overline{\sigma}_a$, respectively, and wherein $A_{app}$ is a surface area of the thin glass, $L_{app}$ is a summated edge length of opposite edges of the thin glass, (Continued)

and Φ is a predefined maximum fracture rate within a period of time of at least half a year.

19 Claims, 3 Drawing Sheets

(51) Int. Cl.
| | |
|---|---|
| *B65H 23/10* | (2006.01) |
| *B65H 18/08* | (2006.01) |
| *C03C 3/076* | (2006.01) |
| *B65H 23/00* | (2006.01) |
| *C03C 3/091* | (2006.01) |
| *C03C 3/087* | (2006.01) |
| *C03C 3/093* | (2006.01) |
| *C03C 3/118* | (2006.01) |
| *B32B 17/06* | (2006.01) |
| *B32B 7/06* | (2006.01) |

(52) U.S. Cl.
CPC ........... *B32B 17/065* (2013.01); *B65H 18/08* (2013.01); *B65H 20/00* (2013.01); *B65H 23/00* (2013.01); *B65H 23/105* (2013.01); *C03C 3/076* (2013.01); *C03C 3/087* (2013.01); *C03C 3/091* (2013.01); *C03C 3/093* (2013.01); *C03C 3/118* (2013.01); *B65H 2515/31* (2013.01); *B65H 2701/17* (2013.01); *B65H 2701/1712* (2013.01); *B65H 2701/18422* (2013.01); *B65H 2801/61* (2013.01)

(58) Field of Classification Search
CPC ......... C03C 3/087; C03C 3/091; C03C 3/093; C03C 3/118
See application file for complete search history.

(56) References Cited

U.S. PATENT DOCUMENTS

| | | |
|---|---|---|
| 8,443,629 B2 | 5/2013 | Kuroiwa et al. |
| 2002/0032117 A1 | 3/2002 | Ulrich et al. |
| 2009/0107182 A1 | 4/2009 | Anderson et al. |
| 2011/0177325 A1* | 7/2011 | Tomamoto ............ B65H 18/28 428/332 |
| 2011/0200812 A1 | 8/2011 | Tomamoto |
| 2011/0217521 A1 | 9/2011 | Teranishi et al. |
| 2011/0223386 A1 | 9/2011 | Tomamoto et al. |
| 2013/0196163 A1 | 8/2013 | Swanson |
| 2013/0207058 A1 | 8/2013 | Wegener et al. |

OTHER PUBLICATIONS

ICG Advanced Course 2006, "Strength of Glass Basics and Test Procedures", Joint Event of the International Commission on Glass and Research Association of the German Glass Industry (HVG), 45 pages.
International Search Report dated Jan. 15, 2015 for corresponding International Application No. PCT/EP2014/070826.
Written Opinion dated Jan. 15, 2015 for corresponding International Application No. PCT/EP2014/070826.

* cited by examiner

METHOD FOR FURTHER PROCESSING THIN GLASS AND THIN GLASS PRODUCED BY SUCH METHOD

CROSS REFERENCE TO RELATED APPLICATIONS

This application is a continuation of International Application No. PCT/EP2014/070826 filed Sep. 29, 2014, which claims benefit under 35 U.S.C. § 119(a) of German Application No 10 2013 110 803.2 filed Sep. 30, 2013, the entire contents of both of which are incorporated herein by reference.

BACKGROUND

1. Field of the Invention

The invention generally relates to thin glasses, in particular to glasses having a thickness of less than one millimeter. More particularly, the invention relates to the confectioning of thin glass ribbons by wounding them into a roll.

2. Description of Related Art

Thin glasses are used in various fields of technology, for example for displays, windows for optoelectronic components, encapsulations, and electrical insulation layers, to mention a few.

In order to be able to handle thin glasses for further processing it is favorable to wind a thin glass ribbon into a roll. Thus, during further processing the glass may be directly unwound from the roll to be processed. However, a problem therewith is that upon winding into a roll bending stresses are generated in the glass. These bending stresses may lead to breakage of the coiled glass ribbon. Already a single fracture may cause a significant problem, since upon unwinding a processing operation has to be interrupted at the break point of the ribbon.

US 2013/0196163 A1 describes a method for bending glass, in which a glass web is laminated onto a reinforcing layer in a manner so that during bending the neutral plane of the bending line lies in the reinforcing layer and the glass web completely lies in the bending-induced compressive stress zone. This requires reinforcing films of a thickness that is a multiple of the glass thickness, and the adhesive of high strength used for the laminate has to exhibit low creeping behavior and will thus be brittle when cured. However, the high strength may imply problems when the adhesive is difficulty detached or cannot completely removed. Anyhow, the removal of the adhesive is an additional processing step necessary before cutting. Moreover, the winding direction is predefined. With respect to the breaking strength of the coiled glass, creeping in the adhesive joint and stress relaxation in the reinforcing layer have to be taken into consideration. If, due to stress relaxation, the neutral plane is shifted into the glass web, the glass comes under tension stress which may even be increased upon unwinding.

U.S. Pat. No. 8,241,751 B2 describes a glass roll with a low instantaneous fracture probability if a minimum bending radius is obeyed for the bends. However, the document does not consider the aspect of fractures occurring with delay. In particular fractures occurring at the edges of the glass ribbon are neglected. For the dimensioning rules described in this document, glass breakage has to be expected after a very short time.

Often, however, a thin glass is not immediately further processed. Rather, it can be assumed that a thin glass roll will be stored for a certain period of time. Also, the transport to a processing plant will take time and cause additional dynamic loads.

Moreover, even for further processed thin glasses, such as glued thin glass sheets or thin glasses in material composites there is a need to avoid failure of the glass element by glass breakage due to tensile stresses in the material caused by the processing.

SUMMARY

Therefore, the invention is based on the object of providing or further processing thin glass in a manner so that any possible glass breakage can be avoided or at least reduced in number.

Accordingly, the invention provides a method for further processing a thin glass, in particular for further processing a thin glass ribbon, wherein with the further processing the thin glass is subjected to a tensile stress $\sigma_{app}$ smaller than the following expression:

$$1.15 \cdot \text{Min}\left(\overline{\sigma}_a - \Delta_a 0.4 \cdot \left(1 - \ln\left(\frac{A_{ref}}{A_{App}}\Phi\right)\right),\right.$$
$$\left.\overline{\sigma}_e - \Delta_e 0.4 \cdot \left(1 - \ln\left(\frac{L_{ref}}{L_{App}}\Phi\right)\right)\right), \quad (1)$$

wherein $\overline{\sigma}_a$, and $\overline{\sigma}_e$ are mean values of the tensile stress at break of samples of the thin glass under bending stress, wherein $L_{ref}$ is the edge length and $A_{ref}$ is the surface area of the samples, wherein $\overline{\sigma}_a$ is the mean value of the tensile stress at break in case of a fracture in the surface of the sample, and $\overline{\sigma}_e$ is the mean value of the tensile stress at break in case of a fracture emanating from an edge of the sample, and wherein $\Delta_e$ and $\Delta_a$ denote the standard deviations of the mean values $\overline{\sigma}_e$ and $\overline{\sigma}_a$, respectively, and wherein $A_{app}$ is the surface area of the thin glass and $L_{app}$ is the summated edge length of opposite edges of the thin glass, and $\Phi$ is a predefined maximum fracture rate within a period of at least half a year. Mean values $\overline{\sigma}_e$, $\overline{\sigma}_a$ are in particular arithmetic mean values.

Obviously, the applicable edge length $L_{ref}$ and surface area $A_{ref}$ of the sample are those portions of the surface area and edge of the glass specimens used for the breaking test, which are subjected to the respective bending stress. Therefore, $L_{ref}$ and $A_{ref}$ are also referred to as reference length and reference surface area, respectively, representing those portions of the edges and of the surface area which are subjected to the critical load when the sample breaks. Accordingly, in the sense of the invention the term sample in particular refers to that portion of a glass specimen of thin glass which was subjected to the bending stress. The bending stress may as well be applied successively to a glass specimen. In this case, surface area $A_{ref}$ and edge length $L_{ref}$ represent the total of all portions of the glass specimen which were subjected to the bending stress during the successive test. For the purposes of the invention the term sample, in turn, refers to the entire tested portion of the glass specimen. If a glass specimen is successively or simultaneously subjected to a load over its entire length of the opposite edges and over its entire surface area, the surface area and the edge length of the glass specimen accordingly correspond to the surface area and the edge length of the sample. However, even in this case, typically not the entire edge length will be tested. If a glass specimen is bent uniaxially, the opposite longitudinal edges are subjected to the load, but not the transverse edges. Accordingly, in this case, the edge length of the sample is the edge length of the two opposite edges subjected to the tensile stress.

Preferably, thin glasses are further processed which have a thickness of less than 500 µm, more preferably not more than 350 µm, most preferably not more than 100 µm. The minimum thickness is preferably 5 µm. A particularly preferred thickness range is between 20 µm and 200 µm. The inventive method may in particular be applied to thin glasses having a thickness t selected from the set of {10 µm, 15 µm, 20 µm, 25 µm, 30 µm, 35 µm, 40 µm, 45 µm, 50 µm, 55 µm, 65 µm, 70 µm, 75 µm, 85 µm, 100 µm, 110 µm, 120 µm, 145 µm, 160 µm, 180 µm, 200 µm, 210 µm, 250 µm}.

With the method a thin glass article according to the invention is obtained in which the thin glass is subject to a tensile stress $\sigma_{app}$ which is smaller than the expression (1) mentioned above.

The invention is based on the findings that fractures at the edges and in the surface of the glass are caused by different imperfections in the glass and that the fracture probabilities are statistically independent from each other. Therefore, the glass strengths in terms of breaking strengths at the edges and in the surface area are considered independently from each other. The effective breaking strength is calculated according to the above expression by the minimum of the tensile stresses for fractures in the surface area and fractures at the edges. In this way, in particular the lifetimes of the thin glass with respect to fractures at the edges and fractures in the surface area occurring under bending stress, which are typically different, are taken into account. Thus, the invention now makes it possible to adjust the tensile stress of the glass article by predefining a lifetime or a fracture probability within a specified period of time.

The predefined maximum fracture rate $\Phi$ is preferably 0.1 or less (i.e. not more than 10%), more preferably less than 0.05 (less than 5%).

In order to achieve a low fracture probability within rather long periods of time, such as up to ten years, it is preferred that with the further processing the thin glass or the glass article obtained by the further processing is subjected to a tensile stress $\sigma_{app}$ smaller than $$0.93 \cdot \mathrm{Min}\left(\overline{\sigma}_a - \Delta_a 0.4 \cdot \left(1 - \ln\left(\frac{A_{ref}}{A_{app}}\Phi\right)\right),\right.$$

$$\left.\overline{\sigma}_e - \Delta_e 0.4 \cdot \left(1 - \ln\left(\frac{L_{ref}}{L_{app}}\Phi\right)\right)\right). \quad (2)$$

Already this comparatively small reduction of the maximum tensile stress by a factor of 1.15/0.93=1.236 results in a considerable increase in the lifetime of the glass article that is subject to the tensile stress.

The method for further processing a thin glass may in particular additionally include a test of glass strength, preferably prior to the step of applying a tensile stress on the thin glass to be processed. Therefore, according to one embodiment of the invention it is generally contemplated that the method for further processing a thin glass comprises the steps that preferably prior to the step of applying a tensile stress during further processing, the mean values of tensile stress $\overline{\sigma}_a$ and $\overline{\sigma}_e$ upon break and their standard deviations $\Delta_e$ and $\Delta_a$ are determined on samples of the thin glass, and that from these parameters a maximum tensile stress of the thin glass is determined, preferably depending on the dimensions thereof (given in particular by the surface area $A_{APP}$ and edge length $L_{app}$ thereof), and that during further processing the thin glass is then subjected to a tensile stress which does not exceed the determined maximum tensile stress. Such a maximum tensile stress as determined based on breaking tests does not necessarily need to be determined based on expressions (1) or (2) mentioned above. However, according to the present invention, if an upper limit is determined with another expression on the basis of breaking tests in order to maintain a long lifetime when subjected to a tensile stress, this upper limit does not exceed the threshold as given by expression (1), preferably expression (2).

Preferably, the thin glass of a glass article according to the invention is subject to a maximum tensile stress of at least 21 MPa due to the further processing. This allows for high stress loads during a lifetime which nevertheless is very long, or accordingly for a low fracture probability over elongated periods of time of more than half a year.

The glass article preferably comprises a lithium aluminosilicate glass, soda-lime silicate glass, borosilicate glass, alkali aluminosilicate glass, alkali-free or low-alkali aluminosilicate glass. Such glasses are for instance obtained by drawing processes such as a downdraw drawing process, by overflow fusion or float technology.

For a low fracture probability, in particular with a tensile stress of at least 21 MPa as specified above, borosilicate glasses are well suited as the thin glass. Preferably, borosilicate glasses are used that have a composition including the following components, in weight percent, on an oxide basis:

| | |
|---|---|
| $SiO_2$ | 40-75 |
| $Al_2O_3$ | 1-25 |
| $B_2O_3$ | 0-16 |
| Alkaline earth oxides | 1-30 |
| Alkali oxides | 0-1. |

Particularly preferred are glasses with a composition comprising the following components, in weight percent, on an oxide basis:

| | |
|---|---|
| $SiO_2$ | 45-70 |
| $Al_2O_3$ | 5-25 |
| $B_2O_3$ | 1-16 |
| Alkaline earth oxides | 1-30 |
| Alkali oxides | 0-1. |

Advantageously, a low-iron or iron-free glass may be used, in particular with an $Fe_2O_3$ content of less than 0.05 wt. %, preferably less than 0.03 wt. %, since this glass exhibits reduced absorption and thus in particular allows for increased transparency.

However, preferred glasses for other applications also include gray glasses or colored glasses.

According to one embodiment, a glass is used that has been tempered or can be tempered. This glass may have been tempered chemically by ion exchange, or thermally, or by a combination of chemical and thermal tempering, or may be suitable for being tempered.

An optical glass may as well be used as a glass material, for example a heavy flint glass, lanthanum heavy flint glass, flint glass, light flint glass, crown glass, borosilicate crown glass, barium crown glass, heavy crown glass, or fluorine crown glass.

The invention is particularly suited for optimizing the mechanical properties of glasses that already exhibit high strength, and/or to take these mechanical properties into account during further processing. High-strength glasses are typically used for applications in which the glasses are actually subjected to high mechanical stress. Therefore, such glasses are designed so as to resist bending stresses acting on the surface area. It is just in this case that the edges of the glasses represent the decisive weakness. Ultimately, a glass sheet made of high-strength glass will break very quickly, if the edge of the sheet has defects and is also subjected to bending stress. The invention now permits to take into account whether the edges consistently keep their quality, for example when individual glass sheets are cut to their final size by severing a larger glass sheet. For example, it might happen that a scoring wheel leaves damage to the glass edges, due to wearing. If this happens, the strength of the entire glass sheet will be considerably reduced. With the inventive method it is now possible to very precisely determine such alterations on the produced product, and to verify the effectiveness of improvements of the edge formation process and to take them into account for specifying the maximum tensile stress. Below, high-strength glasses are listed for which the lifetime can be increased and a reduction of fracture probability within a predetermined time period can be achieved by monitoring the edge strength according to the invention.

According to one embodiment, glasses with the following components of molar composition, in mole percent, are suitable:

| Component | mol % |
|---|---|
| $SiO_2$ | 56-70 |
| $Al_2O_3$ | 10.5-16 |
| $B_2O_3$ | 0-3 |
| $P_2O_5$ | 0-3 |
| $Na_2O$ | 10-15 |
| $K_2O$ | 0-2 |
| MgO | 0-3 |
| ZnO | 0-3 |
| $TiO_2$ | 0-2.1 |
| $SnO_2$ | 0-1 |
| F | 0.001-5 |

In a refinement of this embodiment, a secondary condition that applies is that the quotient of the molar content of fluorine to the molar content of $B_2O_3$, i.e. $F/B_2O_3$, is in a range from 0.0003 to 15, preferably from 0.0003 to 11, more preferably from 0.0003 to 10. These glasses can be chemically tempered and can be used in mobile displays as cover glasses.

Preferably, the composition comprises the following components:

| Component | mol % |
|---|---|
| $SiO_2$ | 61-70 |
| $Al_2O_3$ | 11-14 |
| $B_2O_3$ | 0-0.5 |
| $Li_2O$ | 0-0.1 |
| $Na_2O$ | 11-15 |
| $K_2O$ | 0-2 |
| MgO | 0-3 |
| CaO | 0 (free) |
| ZnO | 0-1 |
| $CeO_2$ | 0-0.05 |
| $ZrO_2$ | 0 (free) |
| $SnO_2$ | 0-0.3 |
| F | 0.001-3 |
| $F/B_2O_3$ | 0.002-6 |

Particularly preferably, the composition comprises the following components:

| Component | mol % |
|---|---|
| $SiO_2$ | 64-70 |
| $Al_2O_3$ | 11-14 |
| $B_2O_3$ | 0-0.5 |
| $Li_2O$ | 0-0.1 |
| $Na_2O$ | 11-15 |
| $K_2O$ | 0-2 |
| MgO | 0-3 |
| CaO | 0 (free) |
| ZnO | <0.1 |
| $CeO_2$ | 0-0.05 |
| $ZrO_2$ | 0 (free) |
| $SnO_2$ | 0-0.3 |
| F | 0.001-1 |
| $F/B_2O_3$ | 0.002-2 |

According to yet another embodiment of the invention, borosilicate glasses of the following glass compositions are used, comprising (in wt. %)

| | |
|---|---|
| $SiO_2$ | 60-85 |
| $Al_2O_3$ | 1-10 |
| $B_2O_3$ | 5-20 |
| $\Sigma\ Li_2O + Na_2O + K_2O$ | 2-16 |
| $\Sigma\ MgO + CaO + SrO + BaO + ZnO$ | 0-15 |
| $\Sigma\ TiO_2 + ZrO_2$ | 0-5 |
| $P_2O_5$ | 0-2, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt %, or for "black glass" from 0 to 15 wt %, and refining agents such as $As_2O_3$, $Sb_2O_3$, $SnO_2$, $SO_3$, Cl, F, $CeO_2$ from 0 to 2 wt %.

Yet another suitable group of glasses are alkali-free borosilicate glasses. In this case, the following composition is preferred, in percent by weight:

| Component | wt % |
|---|---|
| $SiO_2$ | >58-65 |
| $Al_2O_3$ | >14-25 |
| $B_2O_3$ | >6-10.5 |
| MgO | 0-<3 |
| CaO | 0-9 |
| BaO | >3-8 |
| ZnO | 0-<2 |

These glasses are also described in US 2002/0032117 A1, and the contents thereof with respect to the glass compositions and glass properties is fully incorporated into the subject matter of the present application. A glass of this class is marketed by the applicant under the tradename AF 32®.

The table below lists the contents of components of another suitable alkali-free borosilicate glass, and in the right column, based on this glass, a range of compositions of a class of glasses having similar properties:

| Component | Example (wt %) | Range (wt %) |
|---|---|---|
| $SiO_2$ | 70 | 67-73 |
| $Al_2O_3$ | 10 | 8-12 |
| $B_2O_3$ | 10 | 8-12 |
| CaO | 6 | 4-9 |
| BaO | 1 | 0.5-2 |
| SrO | 3 | 2-4 |

Yet another class of preferred types of glass are borosilicate glasses with the following components, in percent by weight:

| Component | wt % |
| --- | --- |
| $SiO_2$ | 30-85 |
| $B_2O_3$ | 3-20 |
| $Al_2O_3$ | 0-15 |
| $Na_2O$ | 3-15 |
| $K_2O$ | 3-15 |
| ZnO | 0-12 |
| $TiO_2$ | 0.5-10 |
| CaO | 0-0.1 |

One glass of this class of glasses is Schott's glass D 263. The glasses are also described in US 2013/207058 A1, with more detailed compositions, and the contents thereof with respect to the compositions of the glasses and their properties is fully incorporated into the subject matter of the present application.

Soda-lime glasses are suitable as well. The table below lists two exemplary embodiments as well as the contents of components of a preferred composition range, in percent by weight:

| | Glass 1 | Glass 2 | Range |
| --- | --- | --- | --- |
| $SiO_2$ | 74.42 | 71.86 | 63-81 |
| $Al_2O_3$ | 0.75 | 0.08 | 0-2 |
| MgO | 0.30 | 5.64 | 0-6 |
| CaO | 11.27 | 9.23 | 7-14 |
| $Li_2O$ | 0.00 | 0.00 | 0-2 |
| $Na_2O$ | 12.90 | 13.13 | 9-15 |
| $K_2O$ | 0.19 | 0.02 | 0-1.5 |
| $Fe_2O_3$ | 0.01 | 0.04 | 0-0.6 |
| $Cr_2O_3$ | 0.00 | 0.00 | 0-0.2 |
| $MnO_2$ | 0.00 | 0.00 | 0-0.2 |
| $Co_3O_4$ | 0.00 | 0.00 | 0-0.1 |
| $TiO_2$ | 0.01 | 0.01 | 0-0.8 |
| $SO_3$ | 0.16 | 0.00 | 0-0.2 |
| Se | 0.00 | 0.00 | 0-0.1 |

Glass 2 is particularly well suitable for producing sheet glass in a float process.

Furthermore, according to one embodiment, soda-lime silicate glasses of the following compositions are used as the glass, comprising (in wt. %):

| | |
| --- | --- |
| $SiO_2$ | 40-80 |
| $Al_2O_3$ | 0-6 |
| $B_2O_3$ | 0-5 |
| $\Sigma Li_2O + Na_2O + K_2O$ | 5-30 |
| $\Sigma MgO + CaO + SrO + BaO + ZnO$ | 5-30 |
| $\Sigma TiO_2 + ZrO_2$ | 0-7 |
| $P_2O_5$ | 0-2, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt %, or for "black glass" from 0 to 15 wt %, and refining agents such as $As_2O_3$, $Sb_2O_3$, $SnO_2$, $SO_3$, Cl, F, $CeO_2$ from 0 to 2 wt %.

According to yet another embodiment of the invention, lithium aluminosilicate glasses of the following compositions are used for the glass material, comprising (in wt %):

| | |
| --- | --- |
| $SiO_2$ | 55-69 |
| $Al_2O_3$ | 19-25 |
| $Li_2O$ | 3-5 |
| $\Sigma Na_2O + K_2O$ | 0-3 |
| $\Sigma MgO + CaO + SrO + BaO$ | 0-5 |
| ZnO | 0-4 |
| $TiO_2$ | 0-5 |
| $ZrO_2$ | 0-3 |
| $\Sigma TiO_2 + ZrO_2 + SnO_2$ | 2-6 |
| $P_2O_5$ | 0-8 |
| F | 0-1 |
| $B_2O_3$ | 0-2, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 1 wt %, and refining agents such as $As_2O_3$, $Sb_2O_3$, $SnO_2$, $SO_3$, Cl, F, $CeO_2$ from 0 to 2 wt %.

Furthermore, alkali-aluminosilicate glasses of the following glass compositions are preferably used as a substrate material, comprising (in wt %):

| | |
| --- | --- |
| $SiO_2$ | 40-75 |
| $Al_2O_3$ | 10-30 |
| $B_2O_3$ | 0-20 |
| $\Sigma Li_2O + Na_2O + K_2O$ | 4-30 |
| $\Sigma MgO + CaO + SrO + BaO + ZnO$ | 0-15 |
| $\Sigma TiO_2 + ZrO_2$ | 0-15 |
| $P_2O_5$ | 0-10, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt %, or for "black glass" from 0 to 15 wt %, and refining agents such as $As_2O_3$, $Sb_2O_3$, $SnO_2$, $SO_3$, Cl, F, $CeO_2$ from 0 to 2 wt %.

Moreover, alkali-free aluminosilicate glasses of the following glass compositions are also preferable used as a substrate material, comprising (in wt %):

| | |
| --- | --- |
| $SiO_2$ | 50-75 |
| $Al_2O_3$ | 7-25 |
| $B_2O_3$ | 0-20 |
| $\Sigma Li_2O + Na_2O + K_2O$ | 0-0.1 |
| $\Sigma MgO + CaO + SrO + BaO + ZnO$ | 5-25 |
| $\Sigma TiO_2 + ZrO_2$ | 0-10 |
| $P_2O_5$ | 0-5, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt %, or for "black glass" from 0 to 15 wt %, and refining agents such as $As_2O_3$, $Sb_2O_3$, $SnO_2$, $SO_3$, Cl, F, $CeO_2$ from 0 to 2 wt %.

Furthermore, low-alkali aluminosilicate glasses of the following glass compositions are also preferable used, comprising (in wt %):

| | |
| --- | --- |
| $SiO_2$ | 50-75 |
| $Al_2O_3$ | 7-25 |
| $B_2O_3$ | 0-20 |
| $\Sigma Li_2O + Na_2O + K_2O$ | 0-4 |
| $\Sigma MgO + CaO + SrO + BaO + ZnO$ | 5-25 |
| $\Sigma TiO_2 + ZrO_2$ | 0-10 |
| $P_2O_5$ | 0-5, | and optionally additions of coloring oxides, such as, e.g., $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare-earth oxides in amounts from 0 to 5 wt %, or for "black glass" from 0 to 15 wt %, and refining agents such as $As_2O_3$, $Sb_2O_3$, $SnO_2$, $SO_3$, Cl, F, $CeO_2$ from 0 to 2 wt %.

Thin glasses that can be used include, for example, those marketed by Schott AG, Mainz, under the tradenames D263, D263 eco, B270, B270 eco, Borofloat, Xensation Cover, Xensation cover 3D, AF 45, AF 37, AF 32, and AF 32 eco.

According to another embodiment, the glass of the thin glass article can be converted into a glass ceramic by heat treatment. Preferably in this case, the glass ceramic consists of a ceramized aluminosilicate glass or lithium aluminosilicate glass, in particular of a chemically and/or thermally tempered ceramized aluminosilicate glass or lithium aluminosilicate glass. In another embodiment, the thin glass article comprises a ceramizable initial glass which ceramizes or further ceramizes in case of fire under the influence of heat and thus provides increased fire safety.

According to yet another embodiment of the invention, a ceramizable glass or a glass ceramic produced therefrom is preferably used with the following composition of the initial glass (in wt %):

$Li_2O$ 3.2-5.0
$Na_2O$ 0-1.5
$K_2O$ 0-1.5
$\Sigma\ Na_2O+K_2O$ 0.2-2.0
MgO 0.1-2.2
CaO 0-1.5
SrO 0-1.5
BaO 0-2.5
ZnO 0-1.5
$Al_2O_3$ 19-25
$SiO_2$ 55-69
$TiO_2$ 1.0-5.0
$ZrO_2$ 1.0-2.5
$SnO_2$ 0-1.0
$\Sigma\ TiO_2+ZrO_2+SnO_2$ 2.5-5.0
$P_2O_5$ 0-3.0.

In another embodiment, a ceramizable glass or a glass ceramic produced therefrom is preferably used with the following composition of the initial glass (in wt %):

$Li_2O$ 3-5
$Na_2O$ 0-1.5
$K_2O$ 0-1.5
$\Sigma\ Na_2O+K_2O$ 0.2-2
MgO 0.1-2.5
CaO 0-2
SrO 0-2
BaO 0-3
ZnO 0-1.5
$Al_2O_3$ 15-25
$SiO_2$ 50-75
$TiO_2$ 1-5
$ZrO_2$ 1-2.5
$SnO_2$ 0-1.0
$\Sigma\ TiO_2+ZrO_2+SnO_2$ 2.5-5
$P_2O_5$ 0-3.0.

In another embodiment, a ceramizable glass or a glass ceramic produced therefrom is preferably used with the following composition of the initial glass (in wt %):

$Li_2O$ 3-4.5
$Na_2O$ 0-1.5
$K_2O$ 0-1.5
$\Sigma\ Na_2O+K_2O$ 0.2-2
MgO 0-2
CaO 0-1.5
SrO 0-1.5
BaO 0-2.5
ZnO 0-2.5
$B_2O_3$ 0-1
$Al_2O_3$ 19-25
$SiO_2$ 55-69
$TiO_2$ 1.4-2.7
$ZrO_2$ 1.3-2.5
$SnO_2$ 0-0.4
$\Sigma\ TiO_2+SnO_2$<2.7
$P_2O_5$ 0-3
$\Sigma\ ZrO_2+0.87\ (TiO_2+SnO_2)$ 3.6-4.3.

The glass ceramic of a thin glass ceramic article made of a thin glass article according to the invention preferably comprises high quartz mixed crystals or keatite mixed crystals as the predominant crystal phase. The crystallite size is preferably smaller than 70 nm, more preferably smaller than or equal to 50 nm, most preferably smaller than or equal to 10 nm.

The invention will now be described in more detail with reference to the accompanying figures. In the figures the same reference numerals designate identical or equivalent elements.

DETAILED DESCRIPTION

Figure 1:
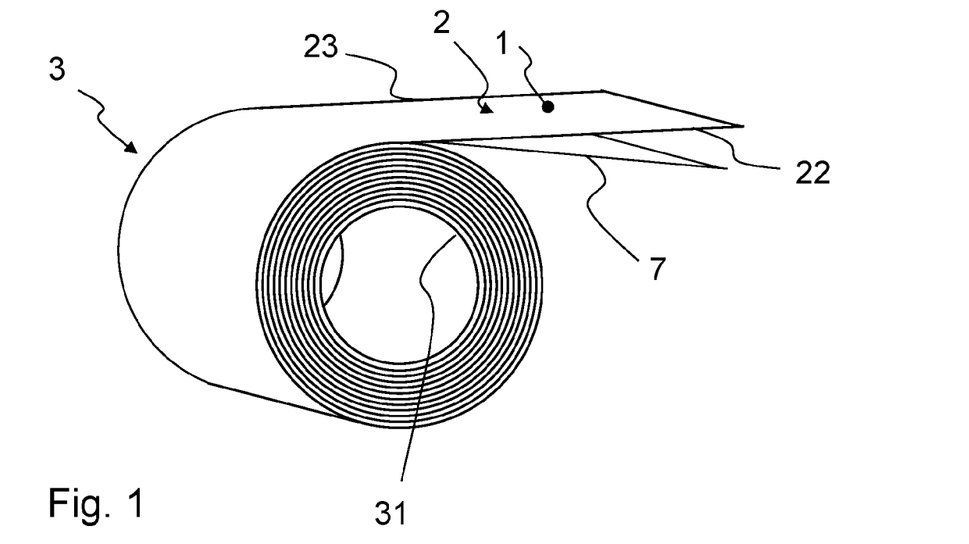
FIG. 1 shows a glass article in form of a coiled thin glass ribbon.

FIG. 1 shows a preferred application of the invention. In this embodiment of the invention, a thin glass 1 is further processed by winding the thin glass 1 in form of a thin glass ribbon 2 into a roll 3. The two edges 22, 23, or more specifically the longitudinal edges of the thin glass ribbon 2 form the end faces of the roll 3. Optionally, the roll 3 may be wound around a mandrel, so that the inner surface of the roll 3 engages the outer surface of the mandrel.

The thin glass 1 or the thin glass ribbon 2 in this form may subsequently be unwound from the roll 3 for further processing steps. This form of confectioning of thin glass 1 is particularly well suited for automated manufacturing processes, such as lamination onto electronic components or the manufacturing of displays.

In order to protect the glass surfaces, another web material 7 may be wound together with the glass, as in the example shown in FIG. 1. This web material then separates the successive glass layers in the roll. Preferably, paper or a plastic material is used as the web material 7.

If the manufacturing process is automated, it is important that the entire coiled thin glass ribbon 2 has no fracture and that the thin glass ribbon 2 is not severed upon automated unwinding. However, the thin glass 1 is bent when being wound. The bending involves a tensile stress to which one of the sides of the thin glass 1 is subjected. The smaller the bending radius, the greater is the tensile stress. The coiled thin glass ribbon 2 will have its smallest bending radius on the inner surface 31 of the roll 3.

Now, some time may pass between the processing of the thin glass 1 by winding it into a roll 3 and the unwinding thereof in a further manufacturing process. Typically, the roll 3 will be stored for some time after having been completed. Also, transportation thereof takes time. It has been found that adverse fractures of the glass may even occur with a time delay after winding, as a result of the unilateral tensile stress generated during bending and despite of the small glass thickness.

The invention now makes it possible to wind thin glass ribbons into rolls 3 which in terms of their inner radius are dimensioned such that with a high probability they will withstand a predetermined time period such as an average or maximum storage period without being damaged. This is generally true as well for other types of processing of the thin glass in which the thin glass is under tensile stress. Similar to the embodiment of the roll, the most frequent tensile stresses occurring in applications or in a processed glass article are caused by bending of the thin glass. According to a preferred embodiment of the invention, therefore, the further processing of the thin glass 1 comprises bending of the thin glass 1, wherein the minimum bending radius R is related to the tensile stress $\sigma_{app}$ as follows:

$$\sigma_{app} = \frac{E}{1-v^2} \frac{t}{2R}. \quad (3)$$

In this expression, E represents the Young's modulus, t is the thickness of the thin glass, and v is the Poisson's ratio of the glass.

The thickness t is preferably less than 500 μm, more preferably not more than 350 μm. Furthermore, it is generally preferred that the glass has at least a thickness of 5 μm.

For the bending radius which satisfies the condition of a maximum tensile stress $\sigma_{app}$ calculated according to expression (1), the following relationship between the bending radius and the tensile stress is obtained by a combination with equation (3):

$$R \geq \frac{\frac{E}{1-v^2} \cdot t}{2.3 \cdot \mathrm{Min}\left(\overline{\sigma}_a - \Delta_a 0.4 \cdot \left(1 - \ln\left(\frac{A_{ref}}{A_{app}}\Phi\right)\right), \overline{\sigma}_e - \Delta_e 0.4\left(1 - \ln\left(\frac{L_{ref}}{L_{app}}\Phi\right)\right)\right)}. \quad (4)$$

Similarly, from a combination of equation (3) with expression (2), the following relationship is obtained for the bending radius which achieves a low fracture probability during elongated periods of time:

$$R \geq \frac{\frac{E}{1-v^2} \cdot t}{1.86 \cdot \mathrm{Min}\left(\overline{\sigma}_a - \Delta_a 0.4 \cdot \left(1 - \ln\left(\frac{A_{ref}}{A_{app}}\Phi\right)\right), \overline{\sigma}_e - \Delta_e 0.4\left(1 - \ln\left(\frac{L_{ref}}{L_{app}}\Phi\right)\right)\right)}. \quad (5)$$

To name an exemplary embodiment of a type of glass suitable for a thin glass, an alkali-free borosilicate glass may be mentioned which comprises the following components, in weight percent:

$SiO_2$ 61
$Al_2O_3$ 18
$B_2O_3$ 10
$CaO$ 5
$BaO$ 3
$MgO$ 3.

This glass has a coefficient of thermal expansion of $3.2*10^{-6}$ 1/K, which is matched to silicon. The modulus of elasticity or Young's modulus amounts to E=74.8 GPa. Poisson's ratio is v=0.238.

In case of a glass article in form of a thin glass ribbon 2 coiled into a roll 3 as shown in FIG. 1, the minimum bending radius R of the thin glass ribbon 2 from which the maximum tensile stress $\sigma_{app}$ according to equation (3) results, will be located on the inner surface 31 of the roll 3. However, in order to be able to keep the roll small and easy to handle, bending radii are preferred for which the maximum tensile stress that occurs on the inner surface 31 is at least 21 MPa.

However, application related cases in which the thin glass 1 is subjected to tensile forces along the sides or along the surfaces thereof are also conceivable. In this case, tensile stresses will arise on both sides and in the volume of the thin glass.

Regardless of the form in which the tensile stresses occur after the further processing, one embodiment of the invention is aimed at a maximum fracture rate $\Phi$ of 0.1 or less, preferably less than 0.05. With the predefined fracture rate $\Phi$, the maximum tensile stress $\sigma_{app}$ corresponding to this fracture rate may then be determined according to expressions (1) or (2) given above, and then, in case of a tensile stress caused by bending, the minimum bending radius may be determined based on expression (3) using this tensile stress value.

Expressions (1) or (2) which indicate the maximum tensile stress corresponding to a predefined fracture probability within at least half a year (expression (1)) or more (expression (2)), further include the surface area of the thin glass and the edge length thereof. That means, the fracture probability scales with the size and shape of the thin glass article. This is important, since thin glasses may have a considerable large surface area, in particular in an intermediate product such as roll 3. For example, in case of roll 3 it is preferred that a thin glass ribbon 2 is wound which has a length of at least 10 meters, preferably at least 50 m, more preferably at least 100 meters. According to yet another embodiment, a thin glass ribbon having a length of up to 1000 meters is coiled up to keep the fracture probability low and at the same time keep the inner radius of the thin glass coil 3 small. Preferably, the width of the thin glass ribbon 2 or of the corresponding roll 3 is 20 centimeters or more. According to one exemplary embodiment, a thin glass roll 3 is produced from a thin glass ribbon 2 having a length of 100 m, a width of 20 cm, and a thickness of 50 μm.

Figure 2:
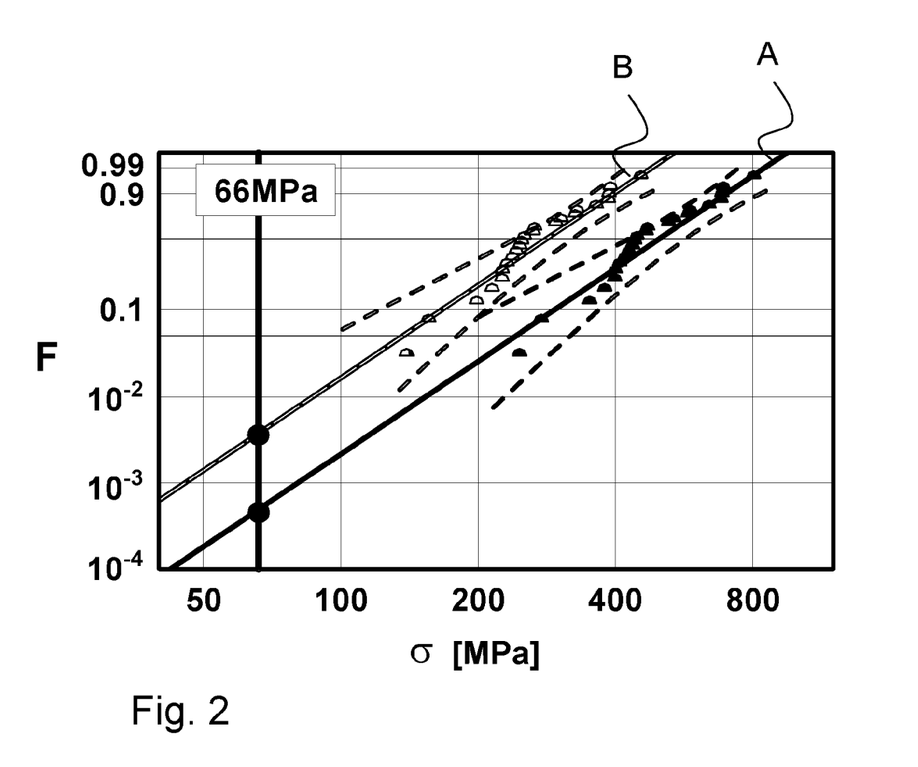
FIG. 2 is a graph of fracture probabilities as a function of tensile stress.

With reference to FIG. 2 the effect of the scaling of the fracture probability is illustrated. FIG. 2 shows a graph of fracture probabilities determined by breaking tests as a function of the tensile stress. The measured values illustrated by solid marks and the corresponding regression line designated "A" were determined from breaking tests on samples of a surface area of 80 mm². The values illustrated by open marks and the corresponding regression line "B" are obtained by scaling the measured values to a surface area of 625 mm² which is subjected to the same load as the samples.

As can be seen from the intersections of the two regression lines with the line drawn at a tensile stress of 66 MPa, for example, due to the larger surface area the fracture probability increases by about one order of magnitude. Although the breaking strength measurements are performed with a dynamic load, in particular an increasing load, these breakage tests permit to determine the fracture probability within a predefined period of time, in particular for long periods of time of at least half a year under a static load.

Figure 3:
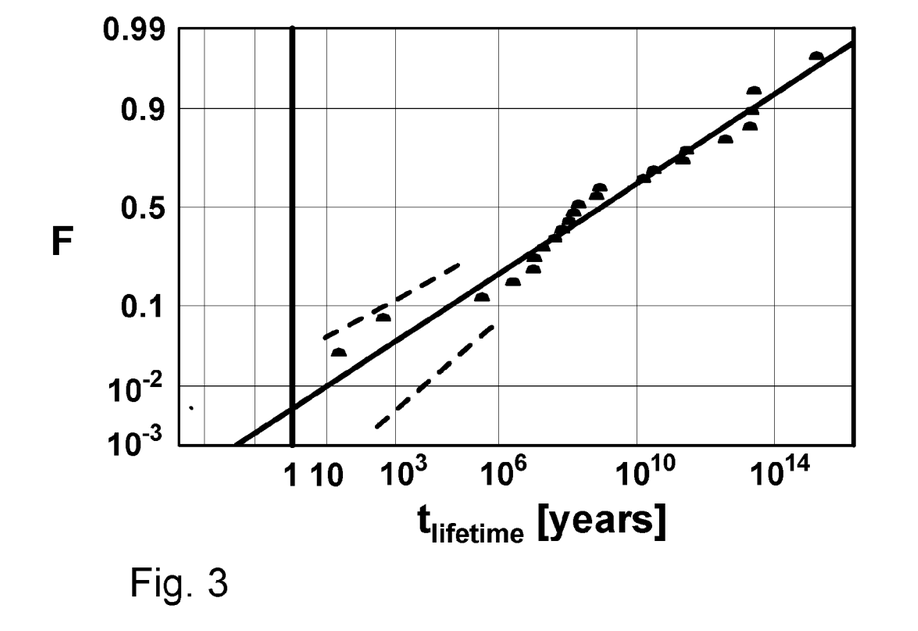
FIG. 3 illustrates the fracture probability of thin glasses as a function of time.

FIG. 3 shows the fracture probability F (corresponding to the fracture rate $\Phi$ in expressions (1) or (2)) as a function of lifetime $t_{lifetime}$ in years for glass articles having a scaled surface area of 625 mm² and under a static tensile stress of 66 MPa. Lifetimes of half a year and longer correspond to the specified periods of time, for which expressions (1) or (2) are valid. Generally, without being limited to the exemplary embodiments, it is therefore contemplated according to one embodiment of the inventive method that the method for further processing a thin glass 1 additionally comprises storing of the thin glass in the state subjected to the tensile stress $\sigma_{app}$ for a period of at least half a year.

Figure 4:
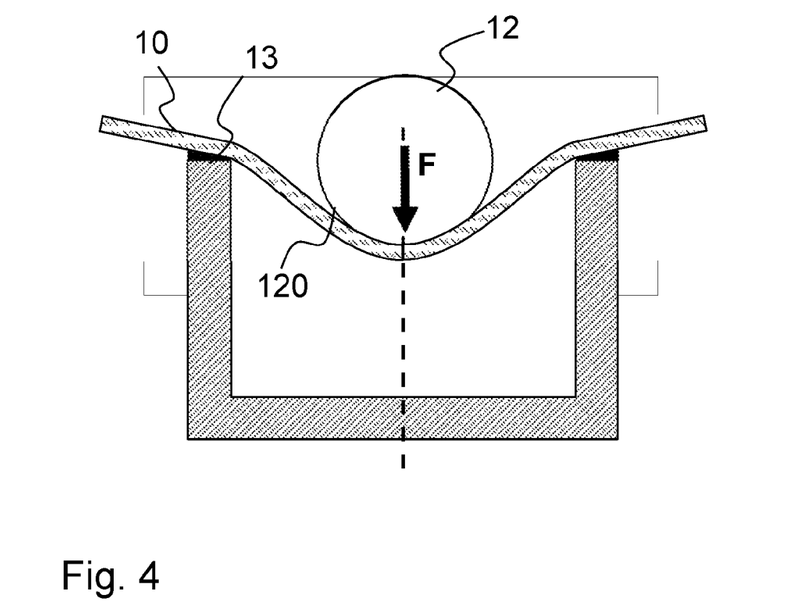
FIG. 4 illustrates a setup for determining the mean value of tensile stress at break for fractures in the surface area of thin glass samples and the standard deviation thereof.

FIG. 4 schematically shows a setup for determining the parameters $\overline{\sigma}_a$ and $\Delta_a$, i.e. the mean value of tensile stress at break for fractures in the surface area of thin glass samples and the standard deviation thereof. Besides this setup described below, alternative measurement setups are likewise possible.

The measurement is based on a procedure in which the parameters $\overline{\sigma}_a$ and $\Delta_a$ are determined by a breaking test in which a thin glass sample 10 is fixed annularly and is loaded with a stamp 12 that has a curved, preferably spherical stamp surface 120, until break. For this purpose, the thin glass sample 10 is placed on an annular, preferably circular support surface 13, as shown in FIG. 4, and is fixed. Stamp 12 presses upon the surface of the thin glass sample 10, preferably centered within the annular support surface 13, with a force F. The force is increased until the thin glass sample 10 breaks. In the setup shown in FIG. 4, a fracture will typically result in the surface area of the thin glass sample, because the tensile stress induced is greatest in the area of engagement of the stamp 12 against the surface of the thin glass sample. This engagement area accordingly defines the surface $A_{ref}$ of the sample 10.

The breaking test is repeated several times. From the force exerted at the time of breakage, the tensile stress on the surface of the thin glass sample may then be calculated. From the measured values, the average tensile stress at break $\overline{\sigma}_a$ and its standard deviation $\Delta_a$ are determined. For this purpose, it is possible to convert the individual force values into tensile stresses, and then to calculate the mean value and the standard deviation.

For fractures emanating from an edge of the thin glass, other measurement setups are suitable, for example the measurement setup described below and shown in FIG. 5. Using this measurement setup, parameters $\overline{\sigma}_e$ and $\Delta_e$ are then determined similarly.

In order to obtain sufficiently trustworthy statistics for reliable determination of the maximum tensile stress of a glass article, according to one embodiment of the invention at least ten, preferably at least twenty, more preferably at least 30, most preferably at least 50 samples 10 of the thin glass 1 are subjected to a tensile stress until break to determine parameters $\overline{\sigma}_a$ and $\Delta_a$, as well as $\overline{\sigma}_e$ and $\Delta_e$. Accordingly, with respect to the exemplary embodiments shown in FIG. 4 and FIG. 5, at least 10, preferably at least 20, more preferably at least 30, most preferably at least 50 valid breaking tests are performed using the setup illustrated in FIG. 4, and also at least 10, preferably at least 20, more preferably at least 30, most preferably at least 50 breaking tests using the setup of FIG. 5 that will be described below.

Figure 5:
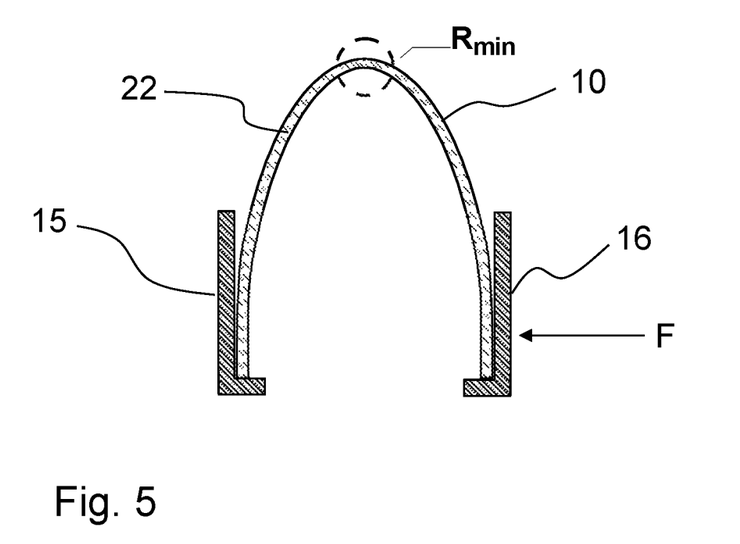
FIG. 5 illustrates a setup for determining the mean value of tensile stress at break for fractures emanating from the edge of a thin glass and the standard deviation thereof.

For this purpose, FIG. 5 shows a setup for determining the mean value of the tensile strength for fractures emanating from the edge of a thin glass and the standard deviation thereof. The procedure performed with the setup comprises to determine the parameters $\overline{\sigma}_e$ and $\Delta_e$ by a bending test, in which a thin glass sample 10 is uniaxially bent until break. In the setup shown in FIG. 5, the thin glass sample 10 is clamped between two jaws 15, 16. Jaws 15, 16 are moved toward each other, so that the thin glass sample 10 is bent more and more. In contrast to the setup shown in FIG. 4, the bending is effected in only one direction. The minimum radius of curvature $R_{min}$ is in the middle between the two jaws. If, for example, the jaws are arranged at a slight angle to each other, the edge at which the jaws 15, 16 are closer to each other will be stressed more than the opposite edge. Accordingly, the minimum radius of curvature will be at this edge. It is also possible to evenly load both edges 22, 23.

For determining the tensile stress at break on the edges, and for determining therefrom, after having tested several thin glass samples, the mean value $\overline{\sigma}_e$ and the standard deviation $\Delta_e$, there are several possibilities. According to one embodiment, the force F exerted to the jaws 15, 16 can be measured, and the tension in the thin glass sample 10 can be determined therefrom.

The tensile stress at break may be determined even more easily by determining the minimum bending radius $R_{min}$ at break and determining the corresponding tensile stress on the edge from this value. Here, the tensile stress $\sigma$ is inversely proportionally related to the bending radius.

An exemplary embodiment for producing a roll of coiled thin glass will now be described.

It is intended to roll a glass web into a roll, and the glass web has a length of 100 m, a width of 20 cm, and a thickness of 0.05 mm and is made of a borosilicate glass of the composition given above, with a Young's modulus of E=74.8 GPa and a Poisson's ratio of ν=0.238. Fracture probability should not exceed 1% ($\Phi$=0.01) during a storage period of one year. The core radius of the winding body is chosen according to equation (3). Strength measurements on samples give the values of $\overline{\sigma}_a$=421 MPa (mean value) and $\Delta_a$=35 MPa (standard deviation) for the surface strength on the basis of normal distributions for a reference surface area of 121 mm², and values of $\overline{\sigma}_e$=171 MPa (mean value) and $\Delta_e$=16.9 MPa (standard deviation) for the edge strength for a reference length $L_{ref}$ of 2 mm. The setups described with reference to FIG. 4 and FIG. 5 can be used for this purpose. Methods for evaluating strength measurements can further be found, for example, in: K. Nattermann, "Fracture Statistics" in "Strength of Glass-Basics and Test Procedures", Advanced Course of the International Commission on Glass and Research Association of the German Glass Industry, Frankfurt (2006), ISBN 3-9210-8947-6).

With $A_{app}$=0.2 m*100 m=20 m², and $L_{app}$=2*200 m=200 m then follows $$\overline{\sigma}_a - \Delta_a 0.4 \times \left(1 - \ln\left(\frac{A_{ref}}{A_{app}}\Phi\right)\right) = \qquad (6)$$
$$\left(421 - 35 \times 0.4 \times \left(1 - \ln\left(\frac{121 \times 10^{-6} \text{ m}^2}{20 \text{ m}^2} \times 0.01\right)\right)\right) MPa = 175 \; MPa$$

-continued $$\overline{\sigma}_e - \Delta_e 0.4 \times \left(1 - \ln\left(\frac{L_{ref}}{L_{app}}\Phi\right)\right) = \qquad (7)$$

$$\left(171 - 16.9 \times \left(1 - \ln\left(\frac{2 \cdot 10^{-3} \text{ mm}}{200 \text{ m}} \cdot 0.01\right)\right)\right) MPa = 55 \text{ MPa} \times$$

The edge strength is thus the decisive strength parameter for the dimensioning of the core of the roll.

For the permissible bending stress, in this case, according to expression (2) or equation (5) it follows:

0.93·Min(175 MPa,55 MPa)=0.93·55 MPa=51 MPa.

With $$\frac{E}{1-v^2} = 79.3 \cdot 10^3 \text{ MPa}$$

and t=0.05 mm, the minimum bending radius of the thin glass ribbon may then be calculated according to equation (3) to give:

$$R \geq \frac{1}{2} \frac{79300 \text{ MPa}}{51 \text{ MPa}} 0.05 \text{ mm} = 39 \text{ mm}.$$

Now, one may round up to a next larger standard roll core diameter, i.e. D=80 mm, for example. With this bending radius or diameter, respectively, the minimum value of the tensile stress of 21 MPa preferred according to the invention is exceeded, so that on the one hand a compact roll is obtained, which on the other hand nevertheless has a low fracture probability.

In addition to the setup shown in FIG. 5 and the discussed measuring method for determining statistical parameters $\overline{\sigma}_e$ and $\Delta_e$, other test methods are also conceivable to obtain very precise statistical values. In the setup shown in FIG. 5, the bending radius varies and is minimal in the center of the edge. Thus, the edge length $L_{ref}$ and the surface area $A_{ref}$ of samples 10 is smaller than the total edge length of opposite edges and the total surface area of the sample. The values of $L_{ref}=2$ mm and $A_{ref}=121$ mm² as mentioned in the exemplary embodiment above are therefore smaller than the actual dimensions of the sample. With suitable measuring methods it is possible to increase the edge length and surface area of the sample which are subjected to the tensile stress. For determining surface strength, setups other than the arrangement shown in FIG. 4 are conceivable as well.

LIST OF REFERENCE NUMERALS

1 Thin glass
2 Thin glass ribbon
3 Roll
7 Web material
10 Thin glass sample
12 Stamp
13 Annular support surface
15, 16 Jaws
31 Inner surface of 3
22, 23 Edges
120 Stamp face

What is claimed is:

1. A method for further processing a thin glass, comprising:

subjecting the thin glass to a tensile stress $\sigma_{app}$ smaller than $$1.15 \cdot \text{Min}\left(\overline{\sigma}_a - \Delta_a 0.4 \cdot \left(1 - \ln\left(\frac{A_{ref}}{A_{App}}\Phi\right)\right),\right.$$

$$\left.\overline{\sigma}_e - \Delta_e 0.4 \cdot \left(1 - \ln\left(\frac{L_{ref}}{L_{App}}\Phi\right)\right)\right),$$

wherein $\overline{\sigma}_a$ is a mean value of a tensile stress at break for fractures in a surface of samples of the thin glass under bending stress, wherein $\overline{\sigma}_e$ is a mean value of a tensile stress at break for fractures emanating from an edge of the samples, wherein $L_{ref}$ is an edge length of the samples and $A_{ref}$ is a surface area of the samples, wherein $\Delta_e$ and $\Delta_a$ denote standard deviations of the mean values $\overline{\sigma}_e$ and $\overline{\sigma}_a$, respectively, and wherein $A_{app}$ is a surface area of the thin glass, $L_{app}$ is a summated edge length of opposite edges of the thin glass, and $\Phi$ is a predefined maximum fracture rate within a period of time of at least half a year.

2. The method as claimed in claim 1, wherein the predefined maximum fracture rate $\Phi$ is 0.1 or less.

3. The method as claimed in claim 1, wherein with the tensile stress $\sigma_{app}$ smaller than $$0.93 \cdot \text{Min}\left(\overline{\sigma}_a - \Delta_a 0.4 \cdot \left(1 - \ln\left(\frac{A_{ref}}{A_{app}}\Phi\right)\right),\right.$$

$$\left.\overline{\sigma}_e - \Delta_e 0.4 \cdot \left(1 - \ln\left(\frac{L_{ref}}{L_{app}}\Phi\right)\right)\right).$$

4. The method as claimed in claim 1, further comprising bending the thin glass to a minimum bending radius R, wherein the minimum bending radius R is related to the tensile stress $\sigma_{app}$ as follows:

$$\sigma_{app} = \frac{E}{1-v^2}\frac{t}{2R},$$

wherein E is Young's modulus of the thin glass, t is the thickness of the thin glass, and v is Poisson's ratio of the thin glass.

5. The method as claimed in claim 4, further comprising winding the thin glass into a roll, the thin glass comprising a glass ribbon.

6. The method as claimed in claim 5, wherein the minimum bending radius R is on an inner surface of the roll.

7. The method as claimed in claim 6, wherein the step of winding comprises winding a length of at least 100 meters into the roll.

8. The method as claimed in claim 1, wherein the thin glass has a thickness of less than 500 μm.

9. The method as claimed in claim 1, wherein the thin glass has a thickness of not more than 350 μm.

10. The method as claimed in claim 1, wherein the tensile stress is at least 21 MPa.

11. The method as claimed in claim 1, further comprising determining a maximum tensile stress of the thin glass from the mean values $\overline{\sigma}_a$, $\overline{\sigma}_e$ and standard deviations $\Delta_e$ and $\Delta_a$, and wherein the step of subjecting the thin glass to the tensile stress $\sigma_{app}$ does not exceed the maximum tensile stress.

12. The method as claimed in claim 1, further comprising determining the mean value $\bar{\sigma}_a$ of the tensile stress at break for fractures and the mean value $\bar{\sigma}_e$ of the tensile stress at break for fractures emanating from the edge by subjecting at least twenty samples of the thin glass to a tensile stress until break.

13. The method as claimed in claim 12, wherein the mean value $\bar{\sigma}_a$ is determined by a breaking test in which a thin glass sample is fixed annularly and is loaded until break using a stamp that has a curved surface.

14. The method as claimed in claim 12, wherein the mean value $\bar{\sigma}_e$ is determined by a bending test in which a thin glass sample is bent uniaxially until break.

15. The method as claimed in claim 1, further comprising storing the thin glass while subjected to the tensile stress $\sigma_{app}$ for a period of at least half a year.

16. A thin glass article comprising:
thin glass subjected to a tensile stress $\sigma_{app}$ smaller than $$1.15 \cdot \mathrm{Min}\left(\bar{\sigma}_a - \Delta_a 0.4 \cdot \left(1 - \ln\left(\frac{A_{ref}}{A_{App}}\Phi\right)\right),\right.$$
$$\left.\bar{\sigma}_e - \Delta_e 0.4 \cdot \left(1 - \ln\left(\frac{L_{ref}}{L_{App}}\Phi\right)\right)\right),$$

wherein $\bar{\sigma}_a$ is a mean value of a tensile stress at break for fractures in a surface of samples of the thin glass under bending stress, wherein $\bar{\sigma}_e$ is a mean value of a tensile stress at break for fractures emanating from an edge of the samples, wherein $L_{ref}$ is an edge length of the samples and $A_{ref}$ is a surface area of the samples, wherein $\Delta_e$ and $\Delta_a$ denote standard deviations of the mean values $\bar{\sigma}_e$ and $\bar{\sigma}_a$, respectively, and wherein $A_{app}$ is a surface area of the thin glass, $L_{app}$ is a summated edge length of opposite edges of the thin glass, and $\Phi$ is a maximum fracture rate of not more than 0.1 within a period of time of at least half a year.

17. The thin glass article as claimed in claim 16, wherein the thin glass is wound into a roll having a radius R on an inner surface of the roll that is related to the tensile stress $\sigma_{app}$ as follows:

$$\sigma_{app} = \frac{E}{1-v^2}\frac{t}{2R},$$

wherein E is Young's modulus, t is a thickness of the thin glass, and v is Poisson's ratio of the thin glass.

18. The thin glass article as claimed in claim 16, wherein the tensile stress $\sigma_{app}$ smaller than $$0.93 \cdot \mathrm{Min}\left(\bar{\sigma}_a - \Delta_a 0.4 \cdot \left(1 - \ln\left(\frac{A_{ref}}{A_{app}}\Phi\right)\right),\right.$$
$$\left.\bar{\sigma}_e - \Delta_e 0.4 \cdot \left(1 - \ln\left(\frac{L_{ref}}{L_{app}}\Phi\right)\right)\right).$$

19. The thin glass article as claimed in claim 16, wherein the thin glass is subject to a maximum tensile stress of 21 MPa.

* * * * *